US009129462B2

(12) United States Patent
Kraemer et al.

(10) Patent No.: US 9,129,462 B2
(45) Date of Patent: Sep. 8, 2015

(54) METHOD FOR MONITORING TRANSPORTATION PROCESSES FOR CONVEYING BANKNOTES IN A SELF-SERVICE TERMINAL

(71) Applicant: WINCOR NIXDORF INTERNATIONAL GMBH, Paderborn (DE)

(72) Inventors: Michael Kraemer, Geseke (DE); Stefan Moock, Altenbeken (DE)

(73) Assignee: WINCOR NIXDORF INTERNATIONAL GMBH (DE)

(*) Notice: Subject to any disclaimer, the term of this patent is extended or adjusted under 35 U.S.C. 154(b) by 0 days.

(21) Appl. No.: 14/359,424

(22) PCT Filed: Nov. 22, 2012

(86) PCT No.: PCT/EP2012/073382

§ 371 (c)(1),
(2) Date: May 20, 2014

(87) PCT Pub. No.: WO2013/076206

PCT Pub. Date: May 30, 2013

(65) Prior Publication Data

US 2014/0326576 A1 Nov. 6, 2014

(30) Foreign Application Priority Data

Nov. 23, 2011 (DE) ........................ 10 2011 055 652

(51) Int. Cl.
*G07D 7/16* (2006.01)
*G07D 11/00* (2006.01)
(Continued)

(52) U.S. Cl.
CPC ............ *G07D 7/162* (2013.01); *G07D 11/0021* (2013.01); *G06K 9/36* (2013.01); *G07F 19/202* (2013.01); *G07F 19/203* (2013.01)

(58) Field of Classification Search
CPC ............. B65H 43/08; B65H 2301/544; B65H 2511/11; B65H 2511/12; B65H 2513/511; G07D 7/162; G07D 2211/00; G07D 11/0021; G07F 19/202; G06K 7/016; G06K 9/00442; G06K 9/36
USPC ............... 194/207, 334; 271/3.15, 3.16, 3.17, 271/265.01, 265.02, 265.03; 235/379; 209/534; 382/135, 137
See application file for complete search history.

(56) References Cited

U.S. PATENT DOCUMENTS 4,189,235 A 2/1980 Guter et al.
4,516,031 A 5/1985 Kaule et al.
(Continued)

FOREIGN PATENT DOCUMENTS

DE 27 52 412 6/1978
DE 31 39 365 4/1983
(Continued)

OTHER PUBLICATIONS

"Prepunched Paper Feed"—D.R. Blankenship et al.—IBM Technical Disclosure Bulletin, vol. 25, May 1983, pp. 6524-6526.
(Continued)

*Primary Examiner* — Mark Beauchaine
(74) *Attorney, Agent, or Firm* — Gerald E. Hespos; Michael J. Porco; Matthew T. Hespos

(57) ABSTRACT

A method for monitoring transportation of bills ensures reliable control of the transportation processes. Each bill (BN) is routed through a light barrier that has a light-sensitive sensor (S) to detect at least one edge of the bill (BN). To suppress detection of windows (W) and to detect the rear edge (HK) of the bill (BN), the signal (S0) produced by the sensor (S) is debounced. The debounce time (dT) is set based on the length of the bill (BN), to a first period (dT1) that corresponds to the expected length of the bill (BN). The debounce time (dT) is set to the first period (dT1) as soon as the signal (S0) produced by the sensor (S) indicates the first appearance of an edge, particularly the front edge (VK), of the bill (BN). The debounce time can be set to a second shorter, period (dT2) after the first period (dT1) has elapsed.

11 Claims, 2 Drawing Sheets

(51) Int. Cl.
*G06K 9/36* (2006.01)
*G07F 19/00* (2006.01)

(56) References Cited

U.S. PATENT DOCUMENTS

| | | | | | |
|---|---|---|---|---|---|
| 4,723,072 | A | | 2/1988 | Naruse | |
| 5,455,659 | A | * | 10/1995 | Ishizu et al. | 399/18 |

FOREIGN PATENT DOCUMENTS

| | | |
|---|---|---|
| DE | 35 00 650 | 7/1985 |
| DE | 10 2010 004 580 | 7/2011 |
| EP | 0 070 621 | 1/1983 |
| EP | 0 080 158 | 6/1983 |
| EP | 0 884 652 | 12/1998 |
| EP | 1 742 183 | 1/2007 |
| WO | 03/023724 | 3/2003 |

OTHER PUBLICATIONS

International Search Report of Feb. 19, 2013, PCT/EP2012/073382 (10 pages).

German Search Report of Jul. 6, 2012, DE 10 2011 055 652.4 (8 pages).

* cited by examiner

METHOD FOR MONITORING TRANSPORTATION PROCESSES FOR CONVEYING BANKNOTES IN A SELF-SERVICE TERMINAL

BACKGROUND

1. Field of the Invention

The invention relates to a method for monitoring transportation processes for conveying bills and to a self-service terminal having an apparatus carrying out the method. In particular, the invention relates to a method for monitoring the transportation processes for conveying banknotes and checks in a self-service terminal, particularly an automated teller machine.

2. Description of the Related Art

In an automated teller machine, but also in other self-service terminals, such as direct payment cash systems, the accepted or dispensable bills (banknotes, checks, vouchers, etc.) need to be transported safely and reliably, e.g. from the banknote store to the dispensing shaft of the automated machine. In particular, it is necessary to ensure that the bills are transported individually and do not overlap or overlie one another during transport. Each transported bill needs to be able to be sensed exactly in order to be able to ensure particularly that the different note values are counted and sorted. In order to sense the bills and in order to control the transport system, the bills are usually routed, according to their length, through at least one light barrier. Each light barrier has at least one light-sensitive sensor that reacts to optical state changes (light-dark or dark-light). Hence, particularly the start (front edge) and/or the end (rear edge) of the individual bill can be detected. An apparatus for handling and transporting bills is described in DE 10 2010 004580 A1, for example. The conventional optical scanning of bills can lead to problems when individual bills have viewing windows that are provided as additional security features. The reason is that the appearance of viewing windows during scanning of the bills leads to multiple state changes being reported in succession, as a result of which it may be difficult to detect the front and/or rear edge of the respective bill exactly.

WO 03/023 724 A2 describes a detection system for optical media in the form of banknotes and other bills. The system is conditioned to detect or to identify viewing windows, that is to say transparent areas, in the bills as well. To this end, a light barrier system is installed that has an optical transmitter and two light-sensitive sensors that are arranged at different positions. While the respective bill is passing through, one sensor identifies the light reflected by the bill; the other sensor identifies the light passing through as soon as a window appears. Hence, the appearance of the various edges, namely the front and rear edges, on the one hand, and any window edges, on the other hand, can be detected. However, this solution is reliant on the windows that appear having sufficiently good transparency, which is not always the case. The transparency of the windows may be very low on account of soiling of the bills or on account of windows that are consciously kept semipermeable or opaque and/or colored. Should windows with low transparency appear, reflections can even result in a window edge being incorrectly detected as a front or rear edge of a bill, and therefore in the control of the transport system operating erroneously.

Further prior art is disclosed in U.S. Pat. No. 5,455,659 A, EP 0 080 158 A2, EP 0 884 652 A2. In addition, the article "Prepunched Paper Feed" by D. R. Blankenship et al, which appeared in the IBM Technical Disclosure Bulletin, Vol. 25, May 1983, on pages 6524-6526, describes a method for safe paper feed for prepunched copy paper.

It is therefore an object of the present invention to provide a method for monitoring transportation processes for bills that ensures reliable control of the transportation processes even for such bills as have windows.

SUMMARY OF THE INVENTION

To suppress the detection of windows and to detect the rear edge of the respective bill, the signal produced by the sensor situated in the light barrier is debounced, the debounce time being set, on the basis of the length of the bill, to a first period that corresponds to the expected length of the bill.

As a result, a debounce time that dynamically matches the bill length in each case and that suppresses the appearance of windows and always results in safe detection of the rear edge, regardless of whether and what types of windows may be included in the respective bill, is used. By way of example, if a bill has a length that corresponds to 60 ms (at the given transport speed), for example, the debounce time is set to 60 ms. The bill transport and the control thereof can therefore be performed safely and reliably. The invention is based particularly on the following insights: by debouncing the sensor signal over a relatively long debounce time, the appearance of windows can be effectively suppressed. However, the front edge of the bill often cannot be debounced liberally, since in many applications it is necessary to react to the front edge quickly and in a time-critical manner, for example when it is necessary for filters to be placed within the transport system. In addition, excessive debouncing of the rear edge would also likewise be problematical in particular application cases, namely when the bill passes through a stop light barrier on a roll store or needs to be sensed by the withdrawal sensor on a singularization and stack module, for example.

The dynamic debouncing proposed here, which involves the debouncing of the rear edge being set to the expected bill length upon the appearance of the first edge, particularly the front edge, allows the aforementioned problems to be advantageously solved.

The invention also proposes a self-service terminal that is equipped with an apparatus operating on the basis of the method.

Advantageous embodiments of the invention can be found in the subclaims.

Accordingly, it is advantageous if the debounce time is set to a first, relatively long, period as soon as the signal produced by the sensor indicates the first appearance of an edge, particularly the front edge, of the bill. As a result, the debounce time is started immediately when the front edge of the bill appears or if there should be a transparent window at the front edge, the end of the window appears, in which case the sensor signal is debounced over the entire length of the bill.

Advantageously, the debounce time is set, after the first period (of 60 ms, for example) has elapsed, to a second, shorter, period that is much shorter than the first period, in particular is less than a value that corresponds to 5% of the length of the bill. The second period is just 1 ms, for example. The effect achieved by this is that after the length-dependent first period (e.g. 60 ms) has elapsed, the sensor signal has only a relatively short debounce time applied to it, since no more windows can be expected at the end of the bill and hence it is possible for the rear edge to be detected or reported in real time.

The self-service terminal according to the invention is equipped with an apparatus for monitoring the transportation processes that operates on the basis of the method, wherein the apparatus has a signal processing section that debounces the signal produced by the sensor in order to suppress the detection of windows and in order to detect the rear edge of the bill, wherein the signal processing section sets the debounce time, on the basis of the length of the bill, to a first period that corresponds to the expected length of the bill.

Preferably, the signal processing section is embodied as a digital debounce unit. It is also possible for the signal processing section to be integrated in a computation unit of the self-service terminal. The self-service terminal may be in the form of an automated teller machine, for example.

The invention and the resultant advantages will now be described in more detail with reference to the appended drawings.

BRIEF DESCRIPTION OF THE DRAWINGS

FIG. 2 shows the dynamic change in the debounce time while a transported bill is passing through.

DETAILED DESCRIPTION OF THE PREFERRED EMBODIMENTS

Figure 1:
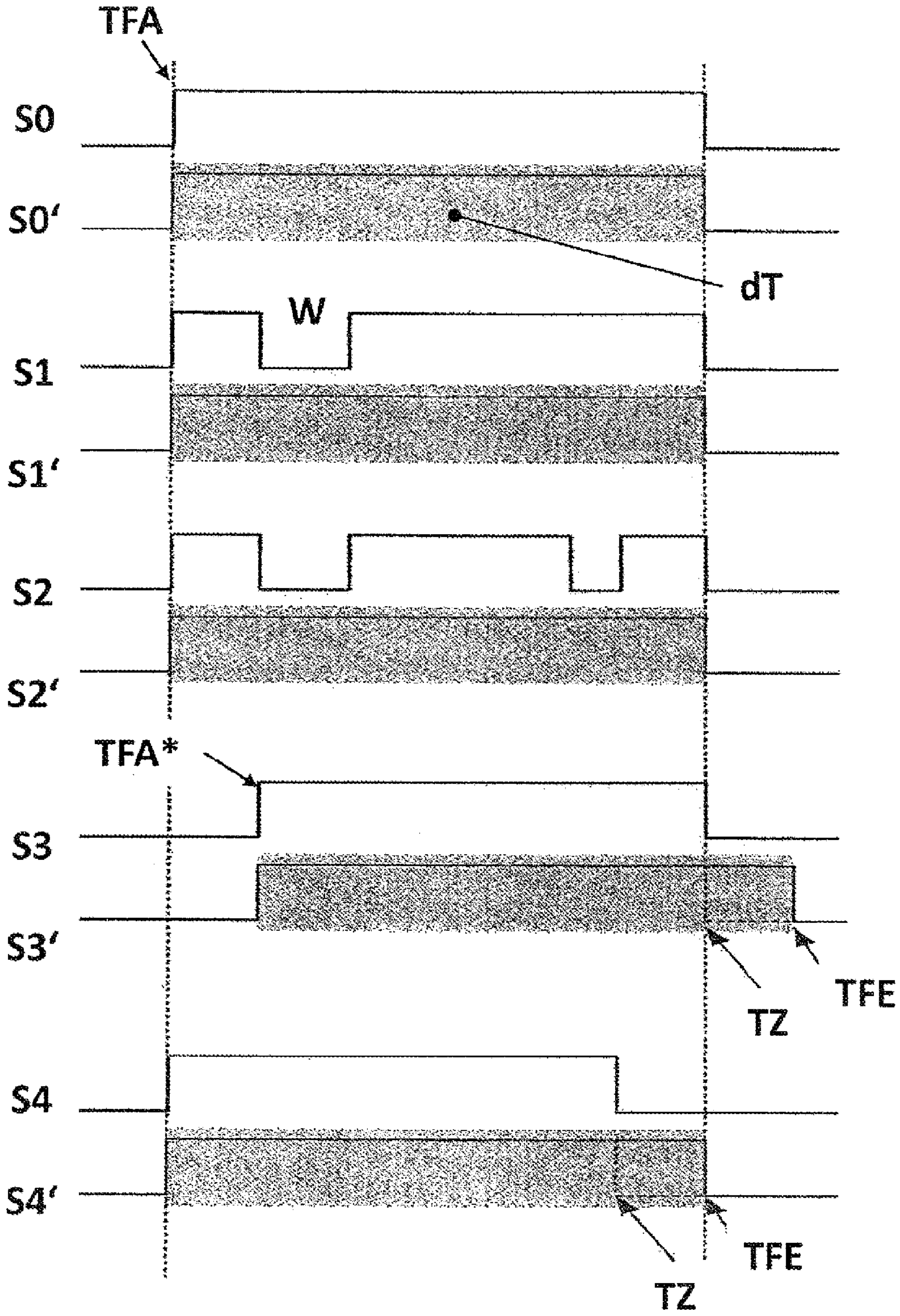
FIG. 1 shows the signal profile of the sensor signal for five exemplary situations, with and without debouncing in each case.

FIG. 1 uses five situations to show the signal profile of the sensor signal with and without debouncing in each case. The top two signal profiles relate to a bill that has no windows and has a length that corresponds to 60 ms of passage time through the light barrier (see also FIG. 3). The signal S0 produced by the light-sensitive sensor has a first rising edge when the front edge appears. The instant of this state change (light-dark) is marked TFA in this case. The sensor signal S0 then remains at one level until the rear edge appears (next state change dark-light at the instant TFE). Since the bill has no windows in this first example, the detection of the front and/or rear edges also cannot be disturbed. Nevertheless, according to the invention, the debounce time dT for the sensor signal S0 is set to a prescribable value when the first edge appears, that is to say in this case when the front edge appears at the instant TFA. The debounce time dT corresponds to the expected bill length and is 60 ms, for example, in this case. For this period, the state of the sensor signal S0 is effectively frozen. Only after the debounce time dT has elapsed is the sensor signal processed just with a very short debounce time of 1 ms, for example. Thus, the signal S0', which is dynamically debounced in the signal processing section (see also FIG. 3), follows the sensor signal S0 in the first example. If disturbances were to appear during the debounce time dT, they would be suppressed.

So that the debounce time dT for passage of the bill can be matched to the length thereof, the length needs to be known. For disbursement processes, this is usually the case, because the bills to be disbursed are prescribed by the system and hence the lengths of said bills are known. For deposit processes, the incoming bills are surveyed by a series of light barriers beforehand in order to ascertain the lengths of the bills too, in particular.

The next two signal profiles relate to the example of a bill that has a window. The sensor signal accordingly shows a multiple state change. By setting the debounce time dT to the apparent length, however, the appearance of the window is suppressed and the safe detection of the rear edge at the instant TFE is ensured. The profile of the debounced signal S1' is as for a windowless bill. This is also the case should the bill have multiple windows and should the sensor signal S2 have a corresponding number of state changes. In this case, too, the profile of the debounced signal S2' is as for a windowless bill. The period of the debounce time dT after having been matched to the apparent length is preferably precisely the actual apparent length (e.g. 60 ms) or a little less, as a result of which the appearance of the rear edge is not suppressed by this debounce time and the rear edge is immediately indicated. However, the detection of the rear edge should also be debounced somewhat, e.g. with a debounce time of 1 ms. The rear edge is then reported at a time very close to the instant TFE. The actual detection of the rear edge takes place beforehand at the instant TZ and merely prompts a time stamp to be produced that is routed to the control section with the later report (at the instant TFE; see also the next signal profiles). Said control section then knows precisely when the rear edge has been detected.

The next two signal profiles relate to a bill that has a transparent window or viewing window at its start. The sensor signal S3 therefore indicates the first state change only at the later instant TFA* and then falls back to zero again at TZ. According to the signal profile S3, the bill would appear shorter. In this case, however, the debounce time dT of 60 ms, for example, takes into account the genuine bill length and indicates the detection of the rear edge only at the instant TFE. The profile of the debounced signal S3' is thus in accordance with the conditions that actually prevail; control of the transport system can be performed safely.

The last two signal profiles in FIG. 1 relate to a bill that has a viewing window at its end. The profile of the sensor signal S4 is therefore such that the front edge is indicated correctly at the instant TFA but as early as the start of the window (instant TZ) the signal S4 drops to zero again and remains at this level. Hence, the end of the bill appears shortened. By setting the debounce time dT to the genuine bill length of 60 ms, the debounced signal S4' remains uninfluenced by the appearance of the window and does not fall back to zero until at the instant TFE. Accordingly, the genuine bill length is taken into account and the rear edge is indicated exactly.

Figure 2:
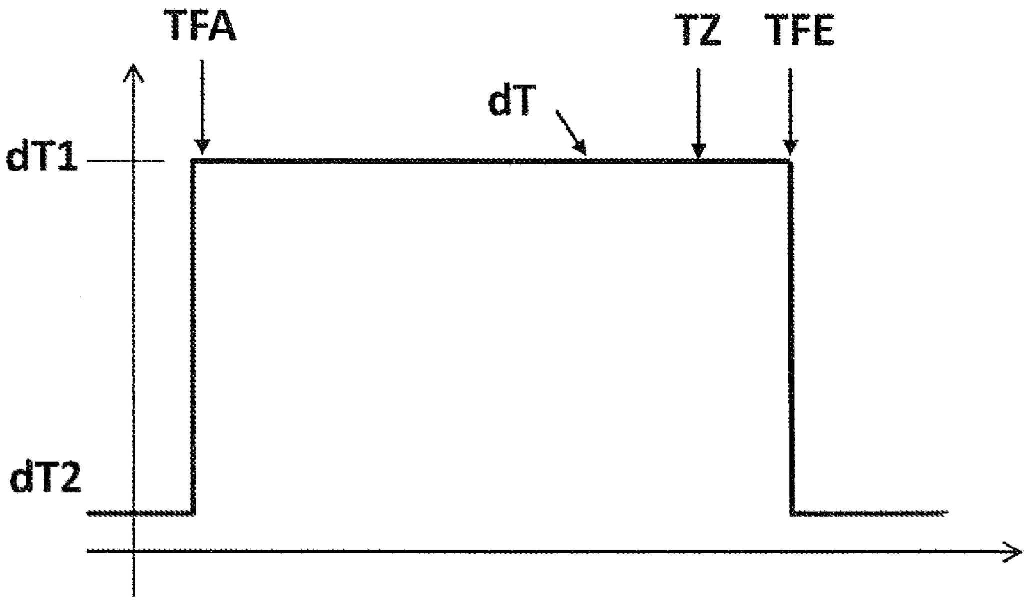
Figure 3:
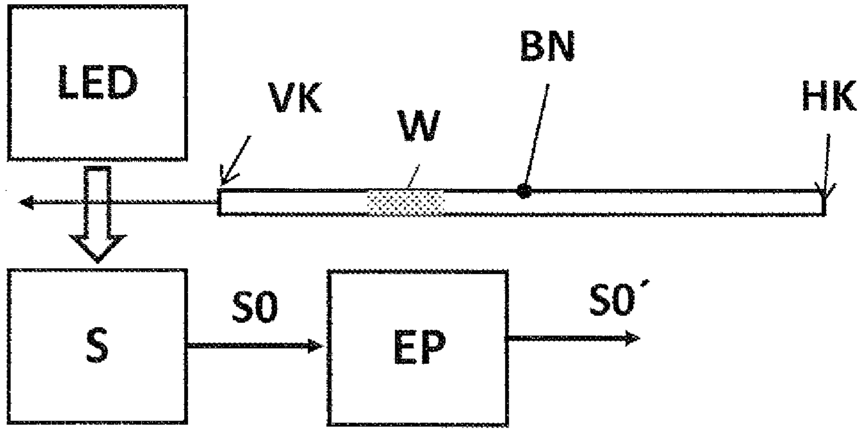
FIG. 3 shows the design of an apparatus for performing the method for monitoring transportation processes.

FIG. 2 illustrates the dynamic setting of the debounce time dT or the change therein while a bill is passing through the light barrier (see also FIG. 3). The debounce time dT has been set to a first value dT1, which corresponds to the expected length of the bill, from the first appearance of an edge (usually the front edge) at the instant TFA. According to the exemplary embodiment described here, the first value dT1 is 60 ms. Otherwise, i.e. before the appearance of a front edge and after the debounce time dT1=60 ms has elapsed, the debounce time dT is set to a very low value dT2, which is 1 ms, for example. The debounce time could also be reset to zero, but it is advantageous to retain a little debouncing in order to detect the rear edge at the instant TFE.

The previously described method for monitoring transportation processes for bills can be performed by the apparatus described below with reference to FIG. 3. The apparatus is preferably integrated into a self-service terminal, particularly into an automated teller machine, and has a signal processing section that is used for dynamically debouncing the sensor signals. The bills or banknotes BN are routed through a light barrier, which has a light-emitting element, in this case a light-emitting diode or light-emitting diode assembly LED, and also a light-sensitive element, in this case a sensor S. When light-dark changes (e.g. at the front edge VK) and dark-light changes (e.g. at the rear edge HK) appear, the sensor S delivers the sensor signal already described previously (see FIG. 1). A downstream signal processing section EP executes the described debouncing of the sensor signal on the basis of the expected length of the bill and therefore delivers the debounced signals that have already been described (see also FIG. 1).

As has also been described previously with reference to FIG. 2, the debounce time dT is matched to the bill length such that the rear edge is always detected reliably and any windows that appear do not disturb the detection of the rear edge. This is preferably accomplished using the following procedure:

The front edge is not debounced. Before the banknote BN arrives, the debounce time dT for the rear edge is set to 60 ms, for example, in accordance with the length of the banknote. After this first debounce time has elapsed (see also dT1 in FIG. 2), the debounce time is set to the low value of dT2=1 ms, for example. The long first debounce time dT1 of 60 ms, for example, means that all windows are suppressed, because no window can be longer than the note length. After 60 ms, the debounce time is reset to 1 ms in order to maintain a certain debouncing for the sensor. Should the light barrier already be free, every further state change, i.e. the rear edge with this short delay, is reported together with the time stamp that indicates when the light barrier has become free. Should the light barrier not yet be free, but rather be concealed, the rear edge is reported immediately as soon as the light barrier becomes free.

By way of example, the solution proposed here can be integrated in the slave in an analog sensor and activated by means of the master. It ought then to be activated only for transport light barriers. If the function is switched on, the sensor will then set a debounce time of 60 ms, for example, for the rear edge upon every front edge and will immediately send itself the command to switch back to 1 ms again in 60 ms.

It is also possible to send the debounce time by PDO (process data object on a CAN bus), so that it is used for the next banknote BN. Hence, it is possible to use the master to configure a sensor for a registered banknote. The banknotes BN can be transported lengthways or crossways. Accordingly, the length or the width of the banknote is used for setting the debounce time. In this context, length may mean both, the extent of the banknote in terms of length and the extent thereof in terms of width, depending on how the banknote is transported. Should it be known that the banknote has a particular length and is lying N degrees askew, the length derived therefrom can be sent directly to the sensor. The latter then uses this length or the corresponding debounce time for all subsequent banknotes, provided that the length value is not overwritten. This makes sense particularly when there are multiple banknotes of the same size or length in succession. In this case, the sensor or the signal processing section would not need to be reconfigured each time, but rather would need to be reconfigured only once when the banknote length changes. At a transport speed of 1400 mm/sec., for example, debounce times of approximately 45-80 ms need to be set for standard banknotes (e.g. euro bills).

The invention particularly has the advantages that any existent windows in the banknotes can no longer be seen or be a disturbance. Signal peaks are also filtered out. In the case of relatively short banknotes, the rear edge is reported with a delay of only a very short period (1 ms). If it can be expected that many of the banknotes pass through the light barrier in a certain skewed position, the second debounce time dT2 should be set to be somewhat longer, e.g. to a value of 10 ms. The relatively short debounce time for the detection of the rear edge means that the latter is indicated in real time. The control of the transport system can thereby be performed safely for virtually any type of bills.

The invention claimed is:

1. A method for monitoring transportation processes for conveying bills in a self-service terminal, wherein each transported bill is routed, according to its length or width, through a light barrier that has a light-sensitive sensor to detect at least one edge of the bill, wherein to suppress a detection of windows and to detect a rear edge of the bill, the method comprises:

producing a signal by the sensor, debouncing the signal, setting a debounce time, based on the length or width of the bill, to a first period that corresponds to the expected length or width of the bill, and setting the debounce time to a second period after the first period has elapsed.

2. The method of claim 1, wherein the debounce time is set to the first period as soon as the signal produced by the sensor indicates a first appearance of a front edge, of the bill.

3. The method of claim 1, wherein the second period is shorter than the first period and less than a value that corresponds to 5% of the length of the bill.

4. A self-service terminal having an apparatus for monitoring transportation processes for conveying bills in the self-service terminal, wherein the apparatus is configured to routes each transported bill, according to its length or width, through a light barrier that has a light-sensitive sensor to detect at least one edge of the bill, wherein the apparatus has a signal processing section that debounces a signal produced by the sensor to suppress detection of windows and to detect a rear edge of the bill, wherein the signal processing section is configured to sets a debounce time, based on a length or width of the bill, to a first period that corresponds to the expected length or width of the bill, and to set the debounce time to a second period after the period has elapsed.

5. The self-service terminal of claim 4, wherein the signal processing section is configured so that the second period is shorter than the first period.

6. The self-service terminal of claim 4, wherein the signal processing section is embodied as a digital debounce unit.

7. The self-service terminal of claim 4, wherein the signal processing section is integrated in a computation unit of the self-service terminal.

8. The self-service terminal of claim 4, wherein the self-service terminal is an automated teller machine.

9. The self-service terminal of claim 8, further comprising a series of light barriers configured to determine the length or width of the bill in advance in the case of deposit processes.

10. The self-service terminal of claim 4, further comprising a series of light barriers to determine the length or width of the bill in advance in the case of deposit processes.

11. The self-service terminal of claim 4, wherein the debounce time can be set by a process data object on a CAN bus.

* * * * *